US012049100B1

(12) United States Patent
Bowie

(10) Patent No.: US 12,049,100 B1
(45) Date of Patent: Jul. 30, 2024

(54) PORTABLE DRY ERASE BOARD WITH CARRYING CASE

(71) Applicant: Ronald Bowie, Fort Worth, TX (US)

(72) Inventor: Ronald Bowie, Fort Worth, TX (US)

( * ) Notice: Subject to any disclaimer, the term of this patent is extended or adjusted under 35 U.S.C. 154(b) by 663 days.

(21) Appl. No.: 17/317,251

(22) Filed: May 11, 2021

Related U.S. Application Data

(63) Continuation-in-part of application No. 14/079,257, filed on Nov. 13, 2013, now Pat. No. 11,225,103.

(51) Int. Cl.
*B43L 1/00* (2006.01)
*B43L 21/04* (2006.01)

(52) U.S. Cl.
CPC ................. *B43L 1/00* (2013.01); *B43L 21/04* (2013.01)

(58) Field of Classification Search
None
See application file for complete search history.

(56) References Cited

U.S. PATENT DOCUMENTS 3,938,772 A * 2/1976 Andrusiak ........... A47B 23/044 40/748
4,429,912 A * 2/1984 Smith, Jr. ........... E05B 65/0888 292/263
4,998,616 A * 3/1991 Hillinger ................ B25H 3/023 220/520
5,515,900 A * 5/1996 West ................... G09F 15/0068 160/230
5,884,338 A * 3/1999 Golde .................... A41D 27/20 224/660
6,582,236 B1 * 6/2003 Dian ......................... B43L 1/00 434/408
6,648,051 B1 * 11/2003 Young ....................... B43L 1/08 402/80 R
6,771,237 B1 * 8/2004 Kalt ..................... G09G 3/3433 348/E9.024
D596,236 S * 7/2009 Hackes ....................... D10/46.1
7,789,430 B2 * 9/2010 Wittmeyer, Jr. .......... B43L 5/02 281/31
8,517,329 B2 * 8/2013 Nash ...................... A47B 97/04 434/408
2001/0040207 A1 * 11/2001 Richardson ............ A47B 97/08 248/172
2003/0106979 A1 * 6/2003 Richardson ............ A47B 97/08 248/460
2005/0022439 A1 * 2/2005 Crump ...................... G09F 1/12 40/711
2005/0074740 A1 * 4/2005 Armstrong .......... G09F 15/0068 434/428
2005/0152765 A1 * 7/2005 Kato ................... F16B 19/1081 411/45
2005/0252422 A1 * 11/2005 Sharpe ..................... A47B 3/00 108/35
(Continued)

*Primary Examiner* — Paul A D'Agostino
(74) *Attorney, Agent, or Firm* — Richard Eldredge; Leavitt Eldredge Law Firm

(57) ABSTRACT

A system includes a foldable dry erase board forming a continuous surface area for writing thereon. The dry erase board includes a first panel foldably attached to a second panel about a pivot joint. The method includes creating the continuous dry erase marker board surface with the first panel and the second panel and folding the first panel onto the second panel about the pivot joint extending partially through a thickness of the board.

14 Claims, 5 Drawing Sheets

(56) References Cited

U.S. PATENT DOCUMENTS

| | | | | |
|---|---|---|---|---|
| 2006/0016951 | A1* | 1/2006 | Nash | B43L 1/00 248/441.1 |
| 2006/0102667 | A1* | 5/2006 | Padilla | A45C 5/045 224/153 |
| 2006/0119039 | A1* | 6/2006 | Reed | A63F 3/00895 273/236 |
| 2006/0237518 | A1* | 10/2006 | Hageneder | B42D 9/00 108/43 |
| 2007/0086842 | A1* | 4/2007 | Merzon | A45C 13/02 402/73 |
| 2007/0102384 | A1* | 5/2007 | Albenda | A47B 96/202 211/85.26 |
| 2008/0286744 | A1* | 11/2008 | Cheris | B43L 1/00 434/408 |
| 2015/0056599 | A1* | 2/2015 | O'Connor | G09F 7/00 434/430 |

* cited by examiner

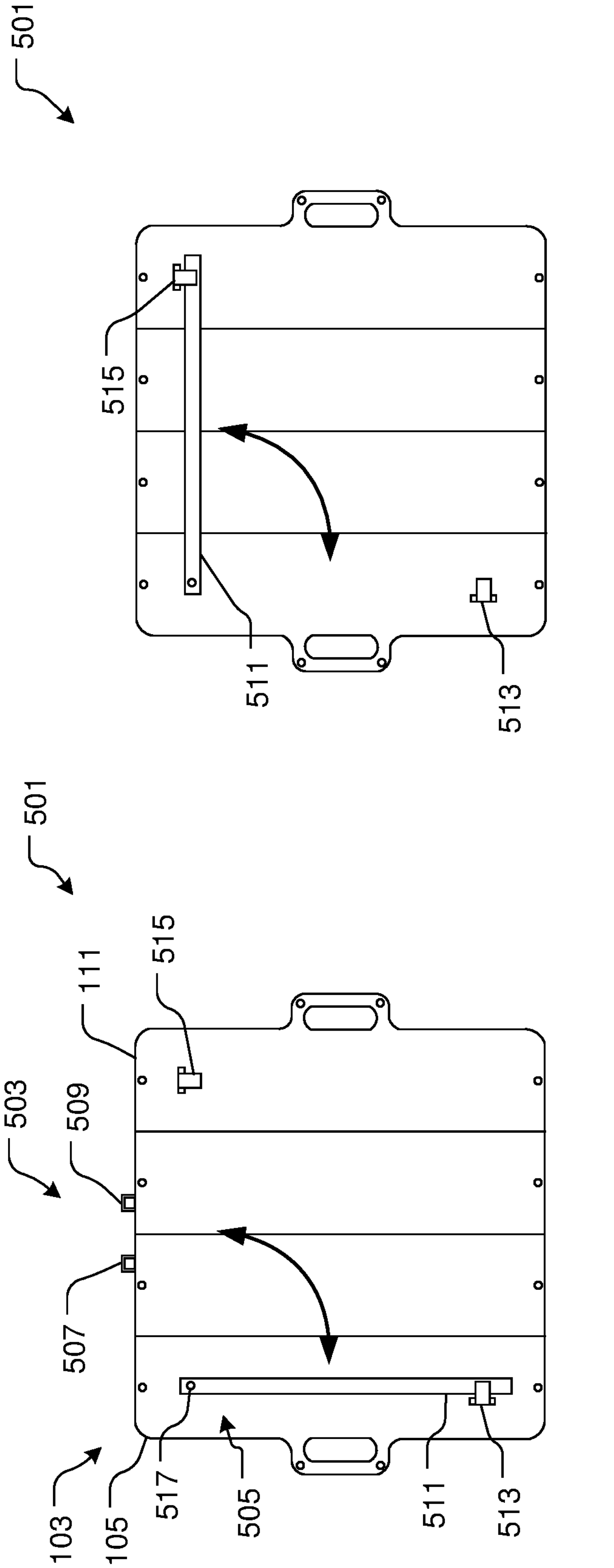
FIG. 5B
FIG. 5A
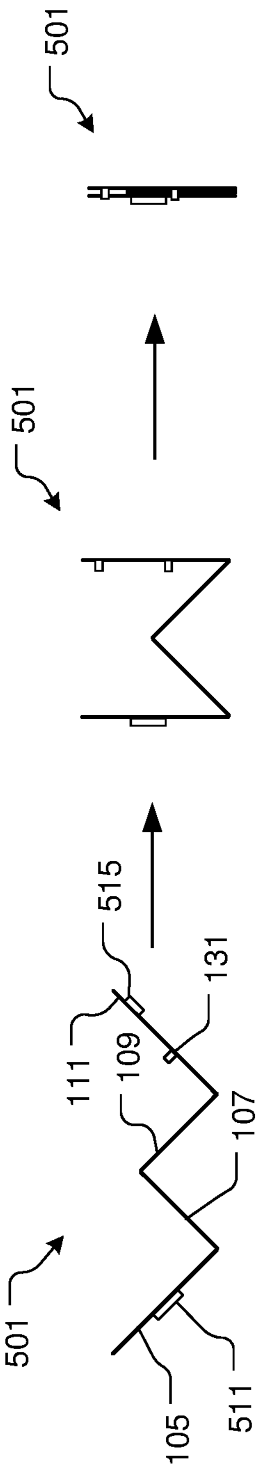
FIG. 6C
FIG. 6B
FIG. 6A

PORTABLE DRY ERASE BOARD WITH CARRYING CASE

BACKGROUND

Field of the Invention

The present invention relates generally to dry erase boards, and more specifically, to a portable, foldable dry erase board.

2. Description of Related Art

Dry erase boards are well known in the art and are effective means for displaying. In one exemplary use, the dry erase board is rigidly attached to a wall of a classroom and written upon by the instructor during lecture. It is known that various uses of the dry erase board are found, resulting in the dry erase board being manufactured in various shapes and sizes; however, it should be understood that dry erase boards are not easily portable, thereby limiting displaying use.

Although the foregoing developments in the above-described dry erase boards represent great strides, many shortcomings remain.

DESCRIPTION OF THE DRAWINGS

The novel features believed characteristic of the embodiments of the present application are set forth in the appended claims. However, the embodiments themselves, as well as a preferred mode of use, and further objectives and advantages thereof, will best be understood by reference to the following detailed description when read in conjunction with the accompanying drawings, wherein:

FIGS. 5A and 5B are back views of a dry erase board system according to an alternative embodiment of the present application;

FIGS. 6A-6C are top views of the dry erase board system of FIG. 1;

Figure 1:
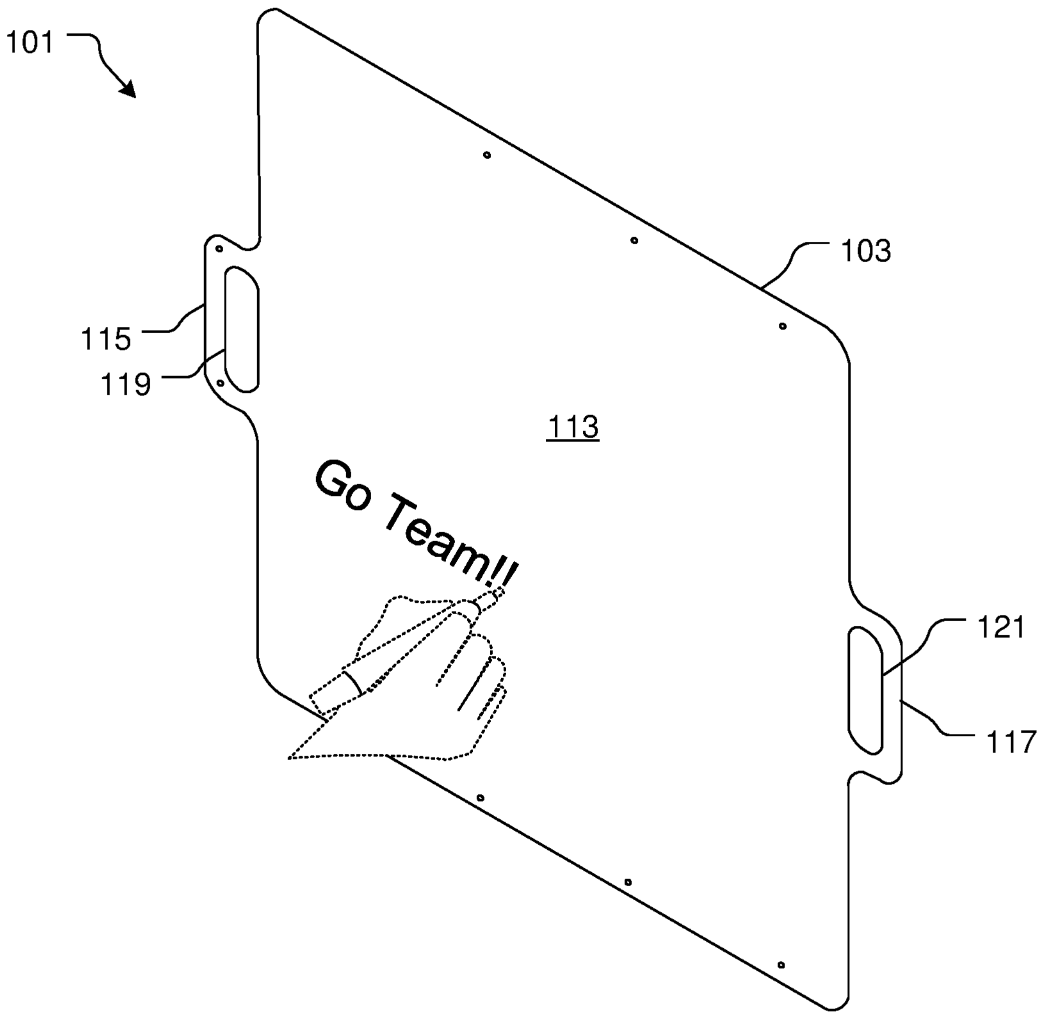
FIG. 1 is an oblique front view of a dry erase board system in accordance with a preferred embodiment of the present application.

While the dry erase board system and method of use pursuant to the disclose of the present application is susceptible to various modifications and alternative forms, specific embodiments thereof have been shown by way of example in the drawings and are herein described in detail. It should be understood, however, that the description herein of specific embodiments is not intended to limit the invention to the particular embodiment disclosed, but on the contrary, the intention is to cover all modifications, equivalents, and alternatives falling within the spirit and scope of the process of the present application as defined by the appended claims.

DETAILED DESCRIPTION OF THE PREFERRED EMBODIMENT

Illustrative embodiments of the system and method of the present application are provided below. It will of course be appreciated that in the development of any actual embodiment, numerous implementation-specific decisions will be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The system and method of use in accordance with the present application overcomes the above-discussed problems commonly associated with conventional dry erase boards. Specifically, the system of the present application includes a board that is foldable and portable, thereby significantly increasing the displaying use in various locations. These and other unique features of the system and method are discussed below and illustrated in the accompanying drawings.

The system and method of use will be understood, both as to its structure and operation, from the accompanying drawings, taken in conjunction with the accompanying description. Several embodiments of the safe room are presented herein. It should be understood that various components, parts, and features of the different embodiments may be combined together and/or interchanged with one another, all of which are within the scope of the present application, even though not all variations and particular embodiments are shown in the drawings. It should also be understood that the mixing and matching of features, elements, and/or functions between various embodiments is expressly contemplated herein so that one of ordinary skill in the art would appreciate from this disclosure that the features, elements, and/or functions of one embodiment may be incorporated into another embodiment as appropriate, unless described otherwise.

Figure 2:
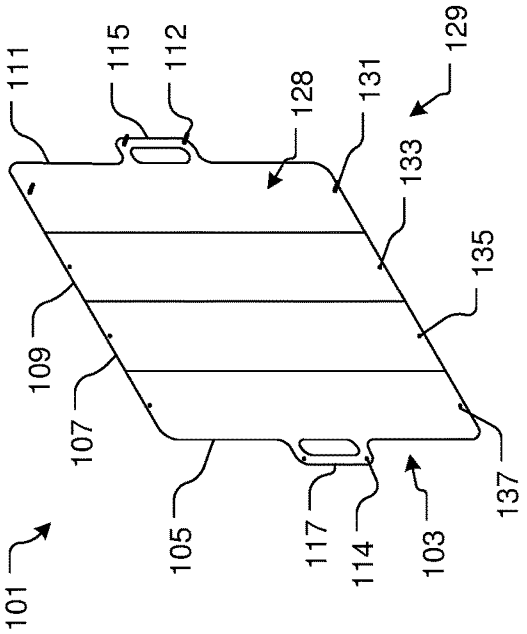
FIG. 2 is an oblique back view of the dry erase board system of FIG. 1.

Referring now to the drawings wherein like reference characters identify corresponding or similar elements throughout the several views, FIGS. 1-2 illustrate various views of a dry erase board system 101 in accordance with a preferred embodiment of the present application.

In the contemplated embodiment, system 301 includes one or more of a dry erase board 103 having four panels: a first panel 105, a second panel 107, a third panel 109, and a fourth panel 111, all being joined about pivot joints. The panels form a continuous surface 113 for writing thereupon with, for example, a dry erase marker (shown in phantom). Although shown having four panels, it will be appreciated that alternative embodiments could include more or less panels depending on the design choice and preferred use. Further, although shown in rectangular shapes, it will be appreciated that the panels can also be manufactured having different shapes and sizes in alternative embodiments.

In the preferred embodiment, board 103 is manufactured with a plastic material that creates a continuous surface for writing thereon with a dry erase marker. The plastic material also allows easy removal of the ink markings with an eraser. However, it is also contemplated manufacturing board 103 with other materials that also share the same features discussed herein.

Board 103 is preferably provided with one or more handles 115, 117 that are integral with respective panels 105, 111 and configured to allowing gripping and carrying access of board 103 during transit and display. The handles 115, 117 are manufactured with two respective holes 119, 121 passing through a thickness of board 103 for allowing a hand of the user to pass therethrough.

Handles 115, 117 are further optionally provided with a fastener 112 configured to secure to a hole 114 for interlocking thereto while the panels are folded. This feature allows the board to be securely retained in the folded position during transit. It will be appreciated that other fastening device, e.g., hook-loop, snap, and the like, are also contemplated in lieu of a fastener configured to pass through and secure to a hole.

One of the unique features believed characteristic of system 101 is the ability to fold board 103 into a manageable size for transport (see FIGS. 6A-6B). To achieve this feature, system 101 includes a plurality of pivot joints, for example, grooves 123, 125, 127 between and joining each panel. The pivot joints are configured to extend the entire length of the panels, as shown, thereby allowing folding between the panels.

Figure 4:
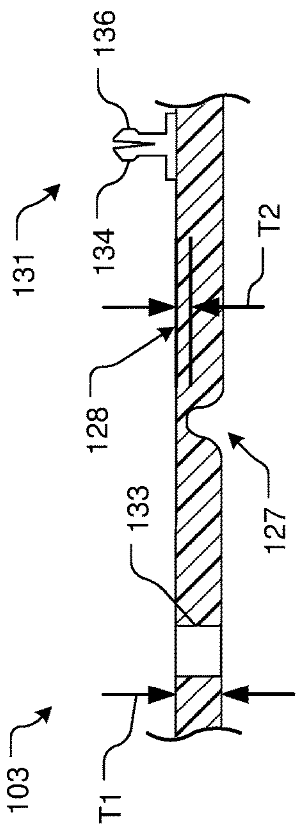
FIG. 4 is an enlarged cross-sectional view of a portion of the dry erase board system taken at IV-IV of FIG. 3.

In the contemplated embodiment, the pivot joints extend within at least partially through the thickness T1 of the board, thereby leaving a thickness T2 between the groove and the surface 113 (see FIG. 4). It should be noted that in the contemplated embodiment, the grooves do not extend through the entire thickness. This feature allows a continuous surface 113 substantially devoid of cracks, creases, or the like to be formed. However, it will be appreciated that it is also contemplated having alternative embodiments wherein the panels are separated from each other and wherein hinges, tape, and other suitable pivot joints are utilized to secure the panels to each other.

Another unique feature believed characteristic of system 101 is the ability to fasten the panels together while in the folded position. To achieve this feature, it is contemplated utilizing a fastener system 129 configured to secure the panels to each other while in the folded position (see, e.g., FIG. 60). Fastener system 129 preferably includes a fastener 131 protruding from a surface 128 of panel 111 and operably associated with three holes 133, 135, and 137 passing through respective panels 109, 107, and 105. Thus, in the contemplated embodiment, fastener 131 is configured to extend through holes 133, 135, and 137 and securely attach to panel 105 (see, e.g., FIG. 60). For ease of description, only one of the two fastener systems is discussed in detail; however, it is also contemplated having at least two fastener systems 129 in the preferred embodiment at opposing ends of the panels, as depicted.

It will be appreciated that it is also contemplated utilizing different fastener systems in alternative embodiments. For example, an alternative embodiment could utilize a strap configured to wrap at least partially around the folded panels and to be secured in fixed position via one or n ore fasteners, e.g., snaps, clips, loop-hook, and so forth.

One unique feature believed characteristic of system 101 is the ease of manufacturing. As discussed, the preferred embodiment includes a plurality of panels integrally joined via pivot joints along with handles and fastener that are also integrally attached to the panels. As such, it is contemplated utilizing an injection molding process to manufacture system 101, which greatly reduces costs.

Figure 3:
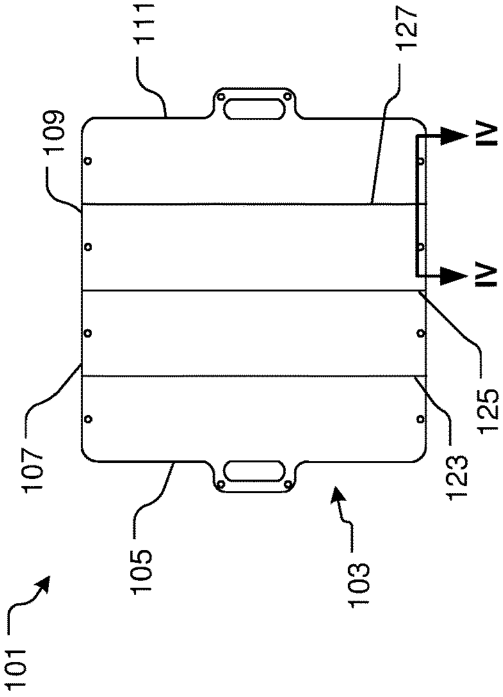
FIG. 3 is a frontal view of the dry erase board system of FIG. 2.

Referring specifically to FIG. 4 in the drawings, an enlarged cross-sectional view of board 103 is shown taken at IV-IV of FIG. 3. In the contemplated embodiment, groove 127 is manufactured in a bell-shaped configuration, which provides ideal bending movement between the two adjacent panels. As depicted, groove 127 is configured to extend partially through the thickness "T1" of the board 103, thereby allowing a continuous surface 113 on the opposing end of the board.

FIG. 4 also depicts a fastener 131 rigidly attached to and protruding from a surface 128 of panel 111. In the contemplated embodiment, fastener 131 is integral with board 103; a feature that greatly reduces the overall cost of manufacturing. In the exemplary embodiment, fastener 131 is manufactured with two elongated members 134, 136 that extend apart from each other and are configured to pass through holes 133, 135, and 137.

FIGS. 5A-5B illustrates an alternative embodiment of system 101. As depicted, system 501 is substantially similar in form and function to system 101 and includes the additional features of a hanger system 503 and a locking mechanism 505. It will be appreciated that the features discussed herein with respect to system 101 are hereby incorporated in system 501 although not reiterated, but shown and referenced in the drawings.

Hanger system 503 preferably includes one or more hanger members 507, 509 integrally secured to one or more panels and configured to secure to a fastener (not shown) associated with an easel, wall, and/or other similarly suitable support structures.

Locking mechanism 505 is configured to secure the panels relatively parallel to each other, thereby creating a relatively flat, continuous surface 113, In the contemplated embodiment, locking mechanism 505 includes an elongated member 511 operably associated with locks 513, 515 on respective panels 105, 111. During use, elongated member 511 pivots about a pivot point 517 from lock 513 to lock 515, as depicted with an arrow. Lock 513 is configured to secure member 511 during transit, while lock 515 is configured to secure member 511 during use. Thus, locking mechanism 505 effectively holds the panels in a secured position relatively parallel to each other. It will be appreciated that system 501 could include additional locking mechanism than illustrated in the depicted embodiment. For example, two locking mechanisms could be utilized to add additional rigidity.

In the exemplary embodiment, locks 513, 515 are manufactured having a L-shaped configuration to received the rectangular elongated member 511. The locks are configured to receive and friction lock with the elongated member; however, it is also contemplated utilizing other locking means, including, but not limited to adhesive, hook-loops, clips, snaps, fasteners, and the Ike in lieu of the preferred embodiment.

Referring now to FIGS. 6A-60 in the drawings, top views of system 501 are shown during the folding process. FIG. 6A shows the initial process of folding board 103, FIG. 6B shows the transitory stage, while FIG. 60 shows the folded position with the locking mechanism securing the panels in a relatively fixed position, ready for transit.

Figure 7:
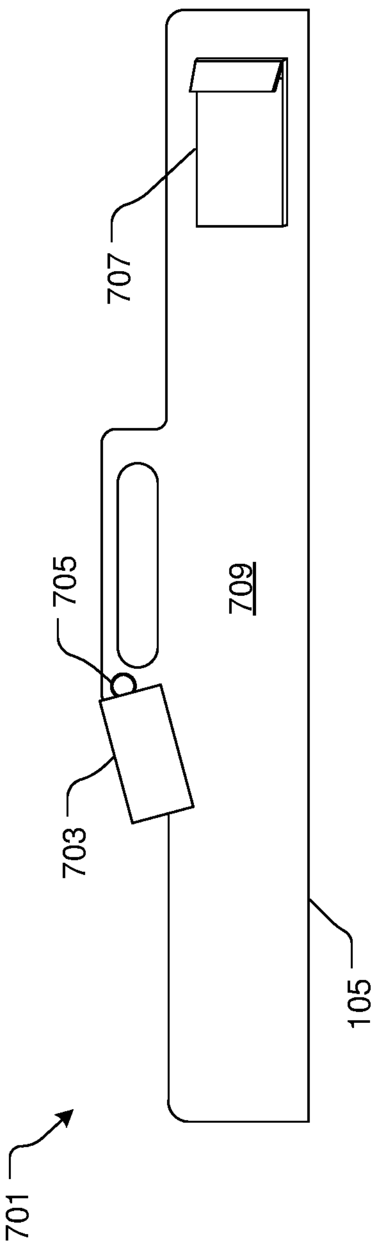
FIG. 7 is a folded side view of the dry erase board system in accordance with an alternative embodiment.

FIG. 7 illustrates an alternative embodiment of systems 101 and 501. As depicted, system 701 is substantially similar in form and function to systems 101 and 501 and includes the additional feature of adding a pocket 703 to panel 105 via a fastener 705 and/or a pocket 707 secured to a surface 709 of panel 105, It will be appreciated that the features discussed herein with respect to systems 101 and 501 are hereby incorporated in system 701 although not reiterated, but shown and referenced in the drawing.

In the contemplated embodiment, pocket 703 is configured to hold dry erase markers, erasers, and the like. The pocket 703 is removably attached to system 701 via a fastener 705, which could include a quick-release device, hook-loop device, snap, clip, and the like. This feature allows easy removal of pocket 703 during non-use.

Whereas, pocket 707 remains secured to panel 105 and is configured to store markers, erasers, and the like.

Figure 8A:
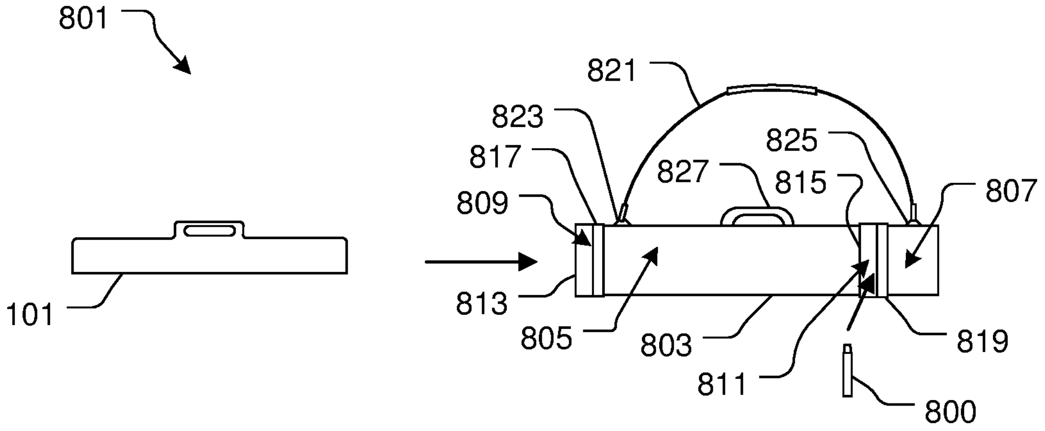
FIGS. 8A and 8B are side views of a carrying case for a dry erase board.
Figure 8B:
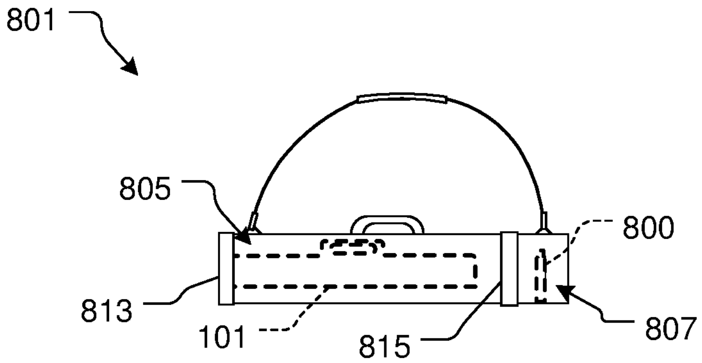

Referring now to FIGS. 8A and 8B, side views of a carrying case 801 is shown. In the contemplated embodiment, the carrying case 801 is configured to store and carry board 101 along with dry erase markers 800 and/or other items associated with utilizing board 101. In the preferred embodiment, case 801 includes a body 803 having inner cavities 805, 807 separated from each other and forming respective openings 809, 811 for board 101 and marker 800 to pass therethrough, as depicted with arrows. Flaps 813, 815 extend from body 803 and are configured to cover respective openings 809, 811 and secure to body 803 via respective fasteners 817, 819. In the preferred embodiment, the fasteners 817, 819 are hook-loop fasteners; however, other quick-release devices are also contemplated. For example, a hook, snap, clip, magnet, and the like. Case 801 is further provided with an adjustable strap 821 configured to fit around the shoulder of the user and removable attached to loops 823, 825 secured to the body 803. As shown in FIG. 8B, the board 801 and the marker 800 fit snugly within respective cavities 805, 807 formed by body 803.

The particular embodiments disclosed above are illustrative only, as the embodiments may be modified and practiced in different but equivalent manners apparent to those skilled in the art having the benefit of the teachings herein. It is therefore evident that the particular embodiments disclosed above may be altered or modified, and all such variations are considered within the scope and spirit of the application. Accordingly, the protection sought herein is as set forth in the description. Although the present embodiments are shown above, they are not limited to just these embodiments, but are amenable to various changes and modifications without departing from the spirit thereof.

What is claimed is:

1. A system, comprising:

a foldable dry erase board forming a continuous writing surface area, the dry erase board, having:

a first panel foldably attached to a second panel about a pivot joint; and a locking mechanism configured to secure the first panel relatively parallel to the second panel, the locking mechanism having:

an elongated member pivotably attached to the first panel; and a first locking device and a second locking device;

wherein the first locking device and the second locking device are configured to secure to the elongated member; and wherein the elongated member pivots between the first locking device and the second locking device;

wherein the pivot joint is positioned on an opposing surface to the continuous surface area; and wherein the first panel is configured to fold onto the second panel.

2. The system of claim 1, further comprising:

a first handle extending from the first panel; and a second handle extending from the second panel;

wherein the first handle and the second handle provide gripping access of the dry erase board.

3. The system of claim 2, further comprising:

a first hole that extends through a thickness of the first handle; and a second hole that extends through a thickness of the second handle;

wherein the first hole aligns with the second hole while the first panel is folded onto the second panel.

4. The system of claim 1, further comprising: a fastener system, having:

a fastener attached to the second panel and configured to secure the first panel to the second panel.

5. The system of claim 4, the fastener system further comprising:

a first hole extending through a thickness of the first panel;

wherein the fastener is configured to extend through and fasten to the first hole.

6. The system of claim 4, further comprising:

a third panel foldably attached to the first panel; and a forth panel foldable attached to the second panel and the third panel.

7. The system of claim 6, the fastener system further comprising:

a second hole extending through the thickness of the third panel; and a third hole extending through the thickness of the fourth panel;

wherein the fastener is configured to pass through the second hole and the third hole.

8. The system of claim 4, wherein the fastener protrudes from a surface of the second panel.

9. The system of claim 1, wherein the pivot joint extends partially through a thickness of the dry erase board.

10. The system of claim 1, further comprising:

a hanger assembly configured to secure Hie dry erase board to a support structure.

11. The system of claim 1, further comprising:

a third panel foldably attached to the first panel; and a forth panel foldable attached to the second panel and the third panel.

12. The system of claim 11, wherein the locking mechanism is configured to secure the third panel and the fourth panel relatively parallel to the first panel and the second panel.

13. The system of claim 1, further comprising: a pocket secured to the first panel.

14. The system of claim 13, wherein the pocket is releasably attached to the first panel.

* * * * *